US012560174B2

(12) United States Patent     (10) Patent No.:   US 12,560,174 B2
Ejiri et al.     (45) Date of Patent:    Feb. 24, 2026

(54) BLOWER

(71) Applicant: Koki Holdings Co., Ltd., Tokyo (JP)

(72) Inventors: Tadakatsu Ejiri, Ibaraki (JP); Kenji Niwa, Ibaraki (JP); Ibuki Kanda, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 18/022,696

(22) PCT Filed: Aug. 20, 2021

(86) PCT No.: PCT/JP2021/030559
§ 371 (c)(1),
(2) Date: Feb. 22, 2023

(87) PCT Pub. No.: WO2022/044991
PCT Pub. Date: Mar. 3, 2022

(65) Prior Publication Data
US 2023/0313805 A1     Oct. 5, 2023

(30) Foreign Application Priority Data
Aug. 31, 2020   (JP) ................................. 2020-145871

(51) Int. Cl.
*F04D 25/08*     (2006.01)
*F04D 17/08*     (2006.01)
(Continued)

(52) U.S. Cl.
CPC ........... F04D 25/084 (2013.01); F04D 25/06 (2013.01); F04D 25/0673 (2013.01);
(Continued)

(58) Field of Classification Search
CPC .. F04D 25/0673; F04D 29/4206; F04D 17/08; F04D 17/165; F04D 25/06–0606;
(Continued)

(56) References Cited

U.S. PATENT DOCUMENTS 4,424,006 A   *   1/1984   Armbruster ........... F04D 25/084
                                 417/313
4,884,314 A   *   12/1989   Miner ..................... A01G 20/47
                                 15/419
(Continued)

FOREIGN PATENT DOCUMENTS

CN        101135139 A   *   3/2008
DE   102019101077 A1   *   7/2019   ............. A01G 20/47
(Continued)

OTHER PUBLICATIONS

International Search Report issued in corresponding International Application No. PCT/JP2021/030559, dated Sep. 21, 2021 w/ English Translation (5 pages).
(Continued)

*Primary Examiner* — Alexander B Comley
(74) *Attorney, Agent, or Firm* — Rimon P.C.

(57) ABSTRACT
A blower with assembly performance that is improved by downsizing of a housing resulted from unitization of a blower fan and a motor is provided. In a blower including a housing configured to house the motor and the blower fan therein and to include an air intake port sucking the air flow thereinto and a tubular air exhaust port configured to exhaust out the air flow toward a front side direction, the motor and the blower fan as an assembly embedded into a motor case are housed in a main body section of a housing. A brushless DC motor is adopted as the motor, and a motor circuit board is mounted on a front side of the motor. A semiconductor
(Continued)

switch element is mounted on the motor circuit board, and the motor is driven at 40,000 revolutions/second or more.

12 Claims, 8 Drawing Sheets

(51) Int. Cl.

| | |
|---|---|
| *F04D 25/06* | (2006.01) |
| *F04D 29/42* | (2006.01) |
| *A01G 20/47* | (2018.01) |

(52) U.S. Cl.
CPC .......... *F04D 29/4206* (2013.01); *A01G 20/47* (2018.02); *F04D 17/08* (2013.01)

(58) Field of Classification Search
CPC .......... F04D 25/068; F04D 25/08–084; F04D 29/4226; F04D 29/4253; A47L 5/14; A01G 20/47
See application file for complete search history.

(56) References Cited

U.S. PATENT DOCUMENTS

| | | | | |
|---|---|---|---|---|
| 9,822,965 | B1 * | 11/2017 | Jackson | .............. F21V 33/0076 |
| 2015/0211535 | A1 * | 7/2015 | Kodato | .............. F04D 29/5806 |
| | | | | 417/371 |
| 2016/0107202 | A1 * | 4/2016 | Suzuki | ................. E01H 1/0809 |
| | | | | 15/319 |
| 2016/0265540 | A1 * | 9/2016 | Tirone | ................. F04D 29/545 |
| 2017/0260985 | A1 * | 9/2017 | Gao | ...................... F04D 25/084 |
| 2018/0094393 | A1 | 4/2018 | Takahashi et al. | |
| 2019/0021561 | A1 * | 1/2019 | Tatara | ..................... F04D 17/06 |
| 2019/0052219 | A1 * | 2/2019 | Hara | ..................... F04D 27/004 |
| 2020/0154962 | A1 * | 5/2020 | Fie | ........................ A47L 9/2884 |

FOREIGN PATENT DOCUMENTS

| | | | | | | |
|---|---|---|---|---|---|---|
| FR | | 2973815 | A1 | * | 10/2012 | ............. A01G 20/47 |
| JP | | S60242827 | A | * | 12/1985 | |
| JP | | H0735797 | B2 | * | 4/1995 | |
| JP | | 2001218708 | A | * | 8/2001 | |
| JP | | 2001353110 | A | * | 12/2001 | |
| JP | | 2005307985 | A | * | 11/2005 | |
| JP | | 2011052591 | A | * | 3/2011 | .......... F04D 29/023 |
| JP | | 2014-15853 | A | | 1/2014 | |
| JP | | 2014015853 | A | * | 1/2014 | |
| JP | | 2014-37818 | A | | 2/2014 | |
| JP | | 2014037818 | A | * | 2/2014 | ............. A01G 20/43 |
| JP | | 2016-079751 | A | | 5/2016 | |
| KR | | 20040026908 | A | * | 4/2004 | |
| TW | | 201719023 | A | * | 6/2017 | .......... F04D 25/08 |
| WO | WO-2016052267 | A1 | * | 4/2016 | .............. A47L 5/24 | |
| WO | WO-2016171031 | A1 | * | 10/2016 | ............. A01G 20/47 | |
| WO | WO-2019180938 | A1 | * | 9/2019 | ............. A45D 20/10 | |
| WO | WO-2019206581 | A1 | * | 10/2019 | ............. A01G 20/47 | |

OTHER PUBLICATIONS

Office Action received in Japanese Application No. 2022-544538, dated Oct. 3, 2023, w/ English translation.

* cited by examiner

FRONT ← UP / REAR → DOWN

PLACEMENT SURFACE

UP

REAR ←——→ FRONT

DOWN

BLOWER

CROSS REFERENCE TO RELATED APPLICATIONS

This application is the U.S. National Phase under 35 U.S.C. § 371 of International Application No. PCT/JP2021/030559, filed on Aug. 20, 2021, which claims the benefit of Japanese Application No. 2020-145871, filed on Aug. 31, 2020, the entire contents of each are hereby incorporated by reference.

TECHNICAL FIELD

The present invention relates to a blower that sucks air from an air intake port into a housing by rotation of a fan housed in the housing and exhausts the air out of the housing from an exhaust port.

BACKGROUND ART

As an example of a related-art blower, a blower that blows away dusts by an air flow to be delivered from a fan as described in Patent Document 1 has been known. Such a portable blower takes ambient air in from an air intake port formed in a housing of the blower by a fan to be driven by a motor, and blows out the sucked air to any region via a nozzle attached to an air exhaust port. An operator performs cleaning work while gripping a handle section of the blower. As an example of this work, a blower main body is held while the nozzle faces an oblique front-and-down side, and the dirt or the like that has adhered to an object to be cleaned is blown away while swinging the nozzle right and left.

RELATED ART DOCUMENT

Patent Document

Japanese Patent 1: Japanese Patent Application Laid-Open Publication No. 2014-37818

SUMMARY OF THE INVENTION

Problems to be Solved by the Invention

The related-art blower includes a motor case that houses a stator and a rotor of a motor therein, and a fan is arranged outside the motor case to be exposed to the inside of an air path of a housing, and therefore, this arrangement becomes an obstructive factor in design for downsizing a casing of the blower. In such a portable blower, reduction in a manufacturing cost based on improvement of the assembly efficiency of the blower has been desired. However, a separate step of attaching the fan to a rotation shaft of the motor or others is needed after attaching the motor case to the housing in an assembly step, and therefore, the number of assemblies increases.

The present invention has been made in view of the above-described background, and its object is to provide a blower that is downsized by changing respective structures of a blower fan and a motor. Another object of the present invention is to provide a blower that has an improved mounting efficiency of a housing and an improved assembly performance by unitizing the blower fan and the motor. Still another object of the present invention is to provide a blower that is easily hung to be balanced and is easily placed on a floor or the like by improving a mounting position of a battery pack.

Means for Solving the Problems

The typical aspects of the inventions disclosed in the present application will be briefly described as follows. According to one feature of the present invention, in a blower including: a motor configured to have a rotor, a stator, and a driving shaft; a fan fixed to the driving shaft and configured to generate an air flow by using a suction force; and a housing configured to house the motor and the fan therein and to include: an air intake port configured to suck the air flow thereinto; and a tubular air exhaust port configured to exhaust out the air flow toward a first direction, a motor case configured to house at least a part of the fan and the motor is provided, and an assembly including the motor, the fan, and the motor case is housed inside the housing. The housing includes: a tubular main body section configured to house the motor; and a handle section configured to extend in an axial direction of the main body section and to be gripped by an operator, the handle section is connected such that the main body section and an internal space communicate with each other on a second direction side opposite to the first direction, and the air intake port is provided in the handle section. An air flow that has entered the housing from the air intake port is sucked from the second direction side of the main body section into the assembly through the handle section, is exhausted in the housing from the assembly toward the first direction side, and is exhausted out of the housing from the air exhaust port. The motor is configured to include: a rotor using a permanent magnet; a stator core; and a coil wound around the stator core, and a circuit board on which an inverter circuit for supplying an excitation current to the coil is mounted is included in the assembly.

According to another feature of the present invention, the motor case includes: an exhaust port positioned on one side of the fan in the axial direction; and a suction port positioned on the other side of the fan in the axial direction, and the fan is arranged on the second direction side (the rear side) of the stator. The blower includes: a switch section configured to switch ON or OFF of the motor; and a control section configured to control rotation of the motor by controlling driving using the inverter circuit, and the control section is arranged at a position inside the housing, the position being different from a position of the motor case. The circuit board is arranged on the first direction side of the stator in an axial line direction. An outer diameter of the fan is preferably within 1.5 times an outer diameter of the stator.

According to still another feature of the present invention, a detachable battery pack for supplying electric power to the motor is detachable from the housing, and a bottom surface of the battery pack functions as a leg portion configured to support the housing when the blower is placed on a placement surface. A nozzle narrowed to have a conical shape is mounted on the air exhaust port of the housing, and a center axial line A1 in a direction of the air blowing made by the nozzle is inclined to be oblique as being closer to the placement surface toward a downstream side in an air exhaust direction. In a state in which the leg portion is placed on the placement surface, an arrangement range of the motor in the center axial line A1 direction coincide with the battery pack. Note that the motor is rotatable at 40,000 revolutions/second or more.

According to still another feature of the present invention, the motor can rotate the fan such that an air speed of 130 m/second or more when a portion having a smallest inner diameter in the nozzle has an inner diameter of 7 to 9 mm. The blower-further includes: a main body section made of the housing and a main body component attached to the housing; and a battery pack attached to the housing and configured to supply electric power to the motor, and a mass of the battery pack is equal to or more than 0.8 times and less than 1.8 times a mass of the main body section. Further, the blower includes a hook including a claw section attached to the housing and configured to extend in a front-rear direction, and a position of the hook in an up-down direction is arranged between a center of gravity of the housing and a center of gravity of the battery pack.

Effects of the Invention

According to the present invention, the motor and the stator are housed inside the housing as the assembly embedded inside the motor case, and therefore, the blower having a high assembly efficiency can be achieved. A battery pack is connected to a portion just below the motor assembly in the housing, and therefore, a freestanding blower is achieved because of using the battery pack as its leg portion when the blower is placed on a floor or the like. As a result, it is unnecessary to arrange the leg portion on the housing side.

BRIEF DESCRIPTIONS OF THE DRAWINGS

DETAILED DESCRIPTION OF PREFERRED EMBODIMENTS

First Embodiment

Figure 1:
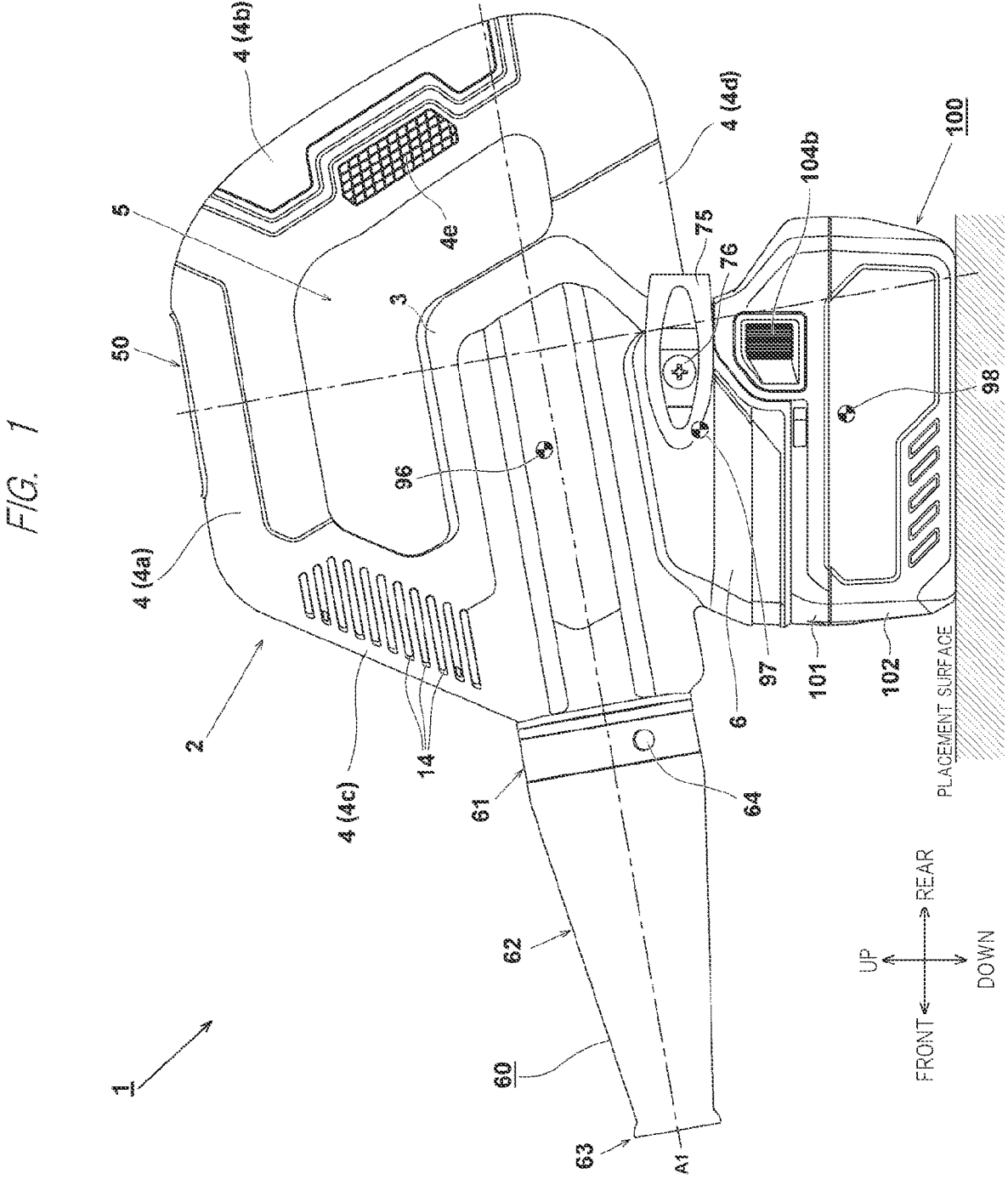
FIG. 1 is a side view of a blower 1 according to an embodiment of the present invention.

Hereinafter, embodiments of the present invention will be described with reference to the accompanying drawings. Note that the same components are denoted by the same reference signs throughout the following drawings, and the repetitive description thereof will be omitted. In the present specification, front-rear, right-left, and up down directions are each described as a direction illustrated in the drawings. FIG. 1 is a side view of a blower 1 according to the present embodiment. The blower illustrated in FIG. 1 is of a cordless type, and drives a motor 25 (described below in FIG. 2) embedded in a housing 2 by using electric power of a battery pack 100 to rotate a fan 32 (described below in FIG. 2), and lets a strong air flow forward (in a first direction) from a nozzle 60. The nozzle 60 has a side of attachment to the housing 2, the side including a straight-tubular cylindrical connection section 61, and includes a tapered section 62 having a diameter being smaller as being closer from the cylindrical connection section 61 toward a distal end section 63. The nozzle 60 is detachable from the housing 2, has protrusions 64 extending outward from inside in a radial direction at two port tons in a circumferential direction of the cylindrical connection section 61, and is used for attachment and fixation of the nozzle 60 to the housing 2. The nozzle 60 is formed coaxially with the center axial line A1 of the air flow to be discharged from an air exhaust port 12*a* (see FIG. 2 for its reference symbol) of the housing 2. By gripping a handle section. 4 of the blower 1, an operator performs a work for blowing away dirt that has adhered to an object to be jetted while applying air from the nozzle 60 to the object to be jetted. For example, in a work for cleaning a horizontal surface such as a floor surface or a desk top, the operator holds the blower 1 while directing the nozzle 60 obliquely downward from the horizontal direction, and jets the air to an object to be cleaned while swinging the nozzle 60 right and left by swinging the handle section 4 right and left.

The housing 2 is manufactured to be unified by a mold made of a synthetic resin, and is configured to include a main body section 3 as a body portion, the handle section 4, and a battery pack mounting section 6. The main body section 3 is formed in a tubular shape having a longitudinal direction on the center axial line A1 of the nozzle 60. The handle section 4 is formed from an upper portion to a rear portion of the main body section 3, and is a portion to be gripped by the operator. In the handle section 4, an upper-side gripping section 4*a* extending in a horizontal direction and a rear-side gripping section 4*b* extending in a substantially vertical direction are formed, a front-side connection section 4*c* for connecting the upper-side gripping section 4*a* and the main body section 3 to each other is formed, and a lower-side connection section 4*d* for connecting the rear-side gripping section 4*b* and the main body section 3 to each other is formed. A portion between the main body section 3 and the handle section 4 is a through section 5 for allowing a finger to pass therethrough when gripped by the operator. A cross-sectional shape of the through section 5 is a substantially L shape in a right side view. The housing 2 is molded in a state in which the housing 2 is split by a center division surface in the left and right direction, and is fixed by a plurality of screws not illustrated. In the present embodiment, the division surface of the housing 2 coincides with a vertical plane passing through the center axial line A1. However, the number of divisions of the housing and an arrangement of the division surface are optional. An elastomer layer is formed in most of an outer surface of the housing 2, and an uneven surface 4*e* for slip prevention is further formed in an elastomer portion in a part of the rear-side gripping section 4*b*.

A switch panel 50 including a switch of the motor 25 (described below in FIG. 2) is provided on an upper surface of the upper-side gripping section 4*a* of the handle section 4. An air intake port 14 is formed on a right surface and a left surface of the front-side connection section 4*c* of the handle section 4. The air intake port 14 is an air window for sucking ambient air into an internal space of the housing 2, and has a plurality of slits each having an elongated shape formed therein in the horizontal direction. Each of the slits is configured such that the air can move out of and into the front-side connection section 4*c* by penetrating a wall surface of the front-side connection section 4*c* from outside to inside, and is formed at the time of molding injection of the synthetic resin of the housing 2. The eleven slits constituting the air intake port 14 each have an elongated shape in a direction substantially parallel to the center axial line A1, and are arranged side by side in the up-down direction. The reason why the air intake port 14 is made of the elongated slits is that the inward suction of foreign substances from the air intake port 14 is prevented. The air intake port 14 may include a filter to prevent suction of fine dust.

When each of the upper-side gripping section 4a and the rear-side gripping section 1b of the handle section 4 is provided with an air intake port, the air intake port may be closed when the operator grips it. Accordingly, no air intake port can be provided in the upper-side gripping section 4a and the rear-side gripping section 4b. Therefore, in the blower 1, the air intake port 14 is provided in either one or both of the front-side connection section 4c and the lower-side connection section 4d. In the present embodiment, the air intake port 14 is provided in the front-side connection section 4c to ensure a ventilation passage extending from the air intake port 14 to a fan 32 (see FIG. 4) described below.

The battery pack mounting section 6 is formed below the main body section 3 of the housing 2, and the battery pack 100 is mounted on the battery pack mounting section 6, i.e., a lower portion at the center of the main body section 3. The battery pack 100 is widely used in an electric tool, and a plurality of battery cells not illustrated are housed in cases 101 and 102 made of synthetic resin. The battery cell is a secondary battery allowed to be repeatedly charged and discharged, and, for example, a lithium ion battery cell can be used. An output of the battery pack 100 is, for example, a direct-current voltage of 18 volts or 36 volts. In the battery pack mounting section 6, two rail sections (not visible in the drawing) horizontally extending in the front-rear direction are formed at a predetermined distance apart from each other in the left-right direction, and a connection terminal group for establishing electrical connection to the battery pack 100 is arranged. The battery pack 100 is mounted on the housing 2 by being horizontally moved from the rear side to the front side of the housing 2. When the battery pack 100 is detached from the housing 2, the battery pack 100 is horizontally moved toward the rear side of the housing 2 while pushing latch buttons 104a (see FIG. 2, described below) and 104b respectively provided on both left and right side surfaces of the battery pack 100.

When the battery pack 100 is mounted on the housing 2, the blower 1 can be stably placed on the placement surface such as the desk top while using the bottom surface of the battery pack 100 as its leg portion. That is, since the bottom surface of the battery pack 100 is set as a contact portion to the placement surface, it is unnecessary to form a dedicated leg portion in the housing 2 of the blower 1. Thus, since the housing 2 is not provided with the leg portion, the blower 1 can be further downsized. In the present invention, note that the formation of the leg portion on the housing 2 side is not excluded. Therefore, not only the bottom surface of the battery pack 100 but also another leg portion may be provided. Also in the case with the leg portion, the center axial line A1 in the direction of the air blowing made by the nozzle 60 may be inclined from a planar direction of a floor surface of the battery pack 100 or an extension direction of the rail section so that the air exhaust direction is closer to the placement surface as being closer to the downstream side.

A hook 75 for hanging the blower 1 from a belt of the operator is attached to the battery pack mounting section 6 between the battery pack 100 and the main body section 3. The hook 75 is a detachable member made of a metal bent in a substantially U shape, and is a claw section in which an extension section on one side (the outer side) of the substantially U shape extends in the front-rear direction. A screw hole (not visible in the drawing) is formed in an extension section on the other side (the inner side) of the substantially U shape, and is fixed to the housing 2 with a screw 76. An opening side of the hook 75 having the substantially U shape faces the nozzle 60 (in the first direction). When the blower 1 is hung by the hook 75, a distal end of the nozzle 60 faces downward, and the rear-side gripping section 4b is on the upper side. After the hanging, a hanging state where it can be easily gripped by the operator is caused. If the screw hole for attachment of the hook 75 is formed on not only the left surface but also the right surface of the battery pack mounting section 6, the hook 75 can be fixed to either the right surface or the left surface of the housing 2.

The blower 1 according to the present embodiment is configured to be smaller in size and lighter in weight than the related-art blower using a large-sized fan, and its center-of-gravity position on the housing 2 side when the battery pack 100 viewed in the front-rear and up-down directions is detached is denoted with "96" while a center-of-gravity position of the battery pack 100 alone is denoted with "98". In this case, the entire weight on the housing 2 side and the weight of the battery pack 100 are set to values close to each other. For example, in a prototype made by the inventors of the present invention, the entire weight on the housing 2 side is 650 g while the weight of the battery pack 100 is 700 g. In the blower 1 of the prototype, the center-of-gravity position of the entire blower 1 with the mounting of the battery pack 100 is denoted with "97". The center-of-gravity position 97 is extremely close to the attachment position of the hook 15 with the screw 16, and therefore, stability at the time of hanging by the hook 75 becomes favorable. Note that the battery pack 100 to be mounted is selectable from a large-sized battery pack having a weight of 975 g, a small-sized battery pack having a weight of 680 g, or the like in addition to the one having the shape as illustrated in FIG. 1. Although the entire center-of-gravity position 97 varies depending on the size of the battery pack 100 to be mounted, the mass of the battery pack 100 is very preferably 0.8 times or more and less than 1.8 times the mass of the main body side excluding the battery pack 100 in terms of a weight balance. Thus, if the entire center-of-gravity position 97 stays at a position in the vicinity of the hook 75, the hanging is easy. And, since the entire center-of-gravity position 97 is just below the upper-side gripping section 4a, a weight balance kept when the operator grips the upper-side gripping section 4a becomes favorable.

Figure 2:
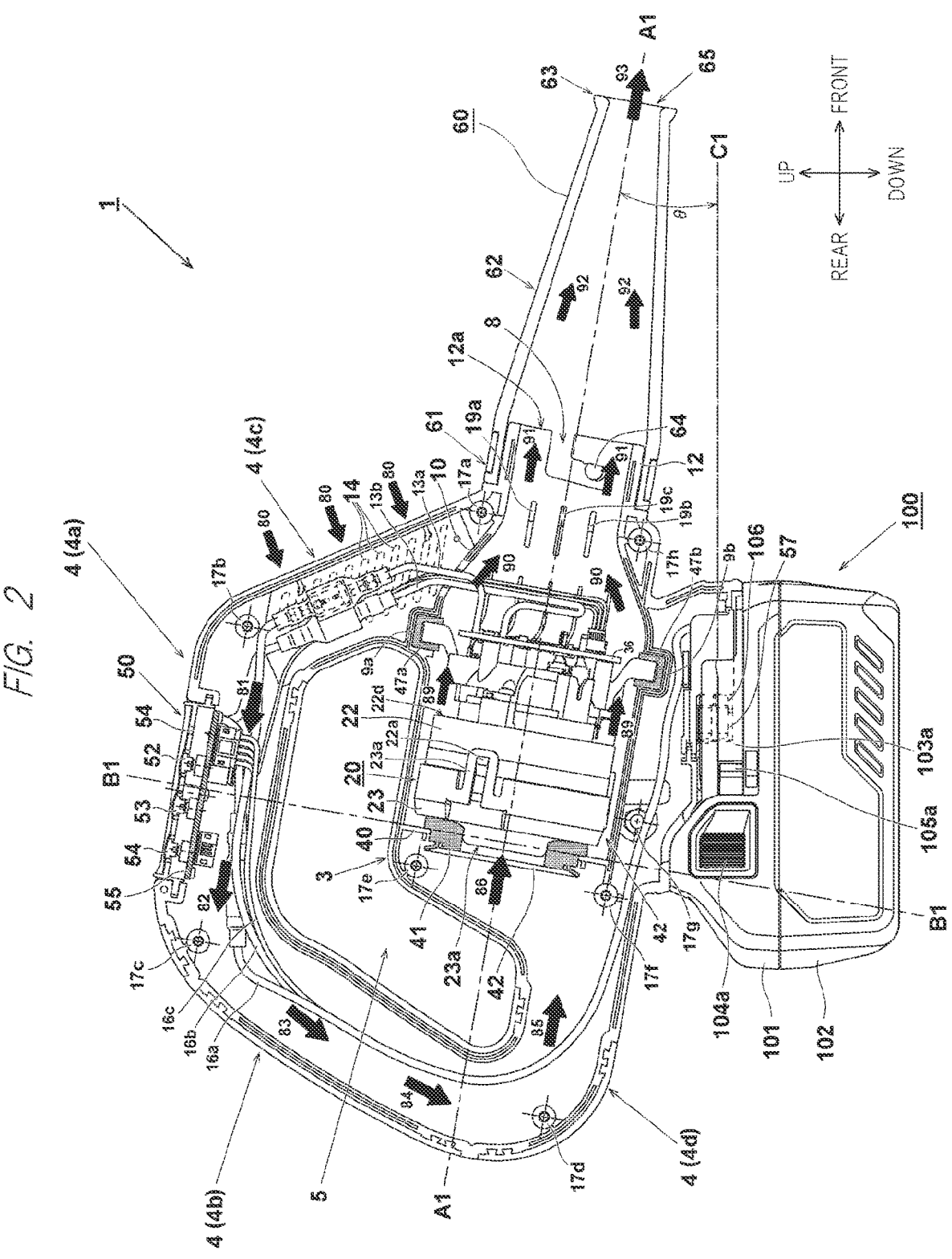
FIG. 2 is a vertical cross-sectional view of the blower 1 illustrated in FIG. 1.

FIG. 2 is a vertical cross-sectional view passing through the center axial line A1 of the blower 1 according to the present embodiment. In the present embodiment, the motor 25 (see FIG. 4), the fan 32 (see FIG. 4), the motor cases (22, 23), and the like are previously assembled as the unified assembly, i.e., the motor unit 20. In a manufacturing and assembling process, the motor unit 20 is embedded into the substantially cylindrical main body section 3 of the housing 2. At this stage, an axial line of a rotation shaft of the motor 25 is arranged to coincide with the center axial line A1 in the discharge direction of the blower 1 so that an inner wall of the main body section 3 and an outer edge of the motor unit 20 separate by a predetermined distance from each other. The motor unit 20 has an opening for suction (an air intake port 23a) on its rear side, and includes an exhaust port 22d that is formed in the vicinity of the outer periphery around the center of the motor unit 20 in the center axial line A1 direction co exhaust the air forward as indicated by arrows 89 from the exhaust port 22*d*. FIG. 2 illustrates only the two upper and lower arrows 89. However, the exhaust port 22*d* is an opening substantially consecutive in an annular shape, and therefore, an air flow as indicated by the arrow 89 is evenly generated in a circumference direction. Thus, the air is blown by the fan 32 (see FIG. 4) embedded into the motor unit 20 housed inside the housing 2. Thus, the fan 32 is housed inside a double housing (the housing 2 and the motor case 21), and therefore, an operation sound to be transmitted to the operator can be reduced.

When the motor 25 is rotated by the electric power of the battery pack 100, a pressure in the housing 2 on the upstream side (in the vicinity of an arrow 86) of the air intake port 14 is made to be negative by the rotation of the fan 32 attached to a not-illustrated rotation shaft (output shaft) of the motor 25. Therefore, the ambient air is sucked from the air intake port 14 into the housing 2 as indicated by arrows 80. An internal space of the front-side connection section 4*c* of the handle section 4 has an opened upper side coupled to an internal space of the upper-side gripping section 4*a* and a lower side, an internal space of which is closed by a partition wall 10. On the other hand, an internal space of the handle section 4 is connected to communicate with the main body section 3 on the rear side (a second direction) opposite to the front side (the first direction). Therefore, the air (ambient air) sucked from the air intake port 14 flows backward in the upper-side gripping section 4*a* as indicated by arrows 81 to 82, flows from the upper-side gripping section 4*a* into the rear-side gripping section 4*b*, and flows in the rear-side gripping section 4*b* as indicated by arrows 83 and 84. An internal space of the rear-side gripping section 4*b* is connected to a rear end of the lower-side connection section 4*d*. Accordingly, the direction of the air that has flowed into the lower-side connection section 4*d* changes forward, flows as indicated by arrows 85 and 86, and is sucked into an internal space of the motor unit 20 by the fan 32 illustrated in FIG. 4.

The air that has been exhausted by the fan 32 (see FIG. 4) is exhausted from the motor unit 20 as indicated by an arrow 89, flows as indicated by arrows 90 and 91, and reaches the air exhaust port 12*a*. The nozzle 60 that is formed to have the cross-sectional area of the air passage being narrower as being closer to the downstream side is connected to the front (the first direction side) of an air exhaust pipe 12 having the air exhaust port 12*a*. The nozzle 60 has a predetermined length in the axial direction for increasing a flow rate since the flow path for the air exhausted from the air exhaust port 12*a* is narrowed as indicated by an arrow 92, and for easily applying the air flow as indicated by an arrow 93 to a specific object. The nozzle 60 is manufactured by casting of the synthetic resin, has a rear end portion in which the cylindrical connection section 61 having a substantially constant diameter is formed, and has the tapered section 62, the diameter of which is smaller as being closer from the cylindrical connection section 61 to a discharge port 65 having a small diameter.

In the present embodiment, almost all of the internal spaces of the housing 2, i.e., the internal spaces from the handle section 4 to the main body section 3 are utilized as the passages (flow paths) for the air, as indicated by the arrows 80 to 91. A front-side connection portion between the front-side connection section 4*c* of the handle section 4 and the main body section 3 is closed by the partition wall 10 to interrupt the air flow. Note that only the necessary number of through holes 10*a* (see FIG. 5 described below for its reference symbol) as less as possible for allowing wirings 13*a* and 13*b* to pass the et are configured. A rear-side connection portion between the handle section 4 and the main body section 3 is configured so that the internal spaces communicate, and is utilized as the air path through which the air flows between the handle section 4 and the main body section 3. Since the air intake port 14 is formed on the side surface of the handle section 4 as described above, the air flow rotating in one direction that is a counterclockwise direction in a right side view is generated around the through section 5 of the housing 2. By this configuration, the length of the air intake passage can be sufficiently ensured even if the housing 2 is downsized, the suction sound of the blower 1 can be sufficiently suppressed, and the blower having high quietness can be achieved.

An upper case 101 of the battery pack 100 is provided with rail grooves 103*a* and 103*b* (103*b* is not visible in the drawing) to be fitted to the rail section on the battery pack mounting section 6 side. A battery-side terminal section 106 having a plurality of slits and a plurality of terminals arranged in the slits is formed between the rail grooves 103*a* and 103*b*. The latch buttons 104*a* and 104*b* (see FIG. 1) are formed on the rear sides of the rail grooves 103*a* and 103*b*. When the battery pack 100 is attached to the battery pack mounting section 6, a main body-side connection terminal 57 is fitted with the battery-side terminal section 106, and therefore, the electric power of the battery pack 100 can be supplied to the motor 25. The main body-side connection terminal 57, the motor 25 and the switch panel 50 are connected to one another via wirings 13*a*, 13*b*, 16*a* and 16*b* and a plurality of signal lines 16*c*.

The switch panel 50 is an operation section to be operated by the operator, and includes a plurality of tactile switches or soft touch switches arranged therein. In this case, the number of revolutions of the motor 25 is settable to two levels, i.e., high and low levels. The switch panel 50 is provided with a warning lamp (an LED 54) of a remaining amount of the battery pack 100, and is configured such that an LED indicating that the motor 25 is operating is lighted up by a small remaining amount to notify the operator of an insufficient battery. In the present embodiment, tactile switches 52 to 54 are used instead of using a slide-type multiple contact switch or a trigger switch conventionally widely used as the switch circuit of the motor 25. By usage of the thin-type switches such as the tactile switches 52 to 54, the switch panel 50 occupied by the internal space of the handle section 4 can be thinned, and an area by which the cross section through which the air flows in the internal space of the handle section 4 is closed can be particularly reduced. A control circuit board 55 is arranged on the lower side of the switch panel 50. The control circuit board 55 is a substrate to be loaded with a circuit that controls the rotation of the motor 25, and the circuit includes a general-purpose microcomputer. A control section controls the number of revolutions of the motor 25 by controlling a direct current so be supplied from the battery pack 100 under PWM (pulse width modulation) control. The control circuit board 55 and the switch panel 50 can be manufactured as one assembly, and therefore, the assembly performance is improved, and besides, a required wiring length from each of the switches to the control section 5 can be shortened.

Figure 3:
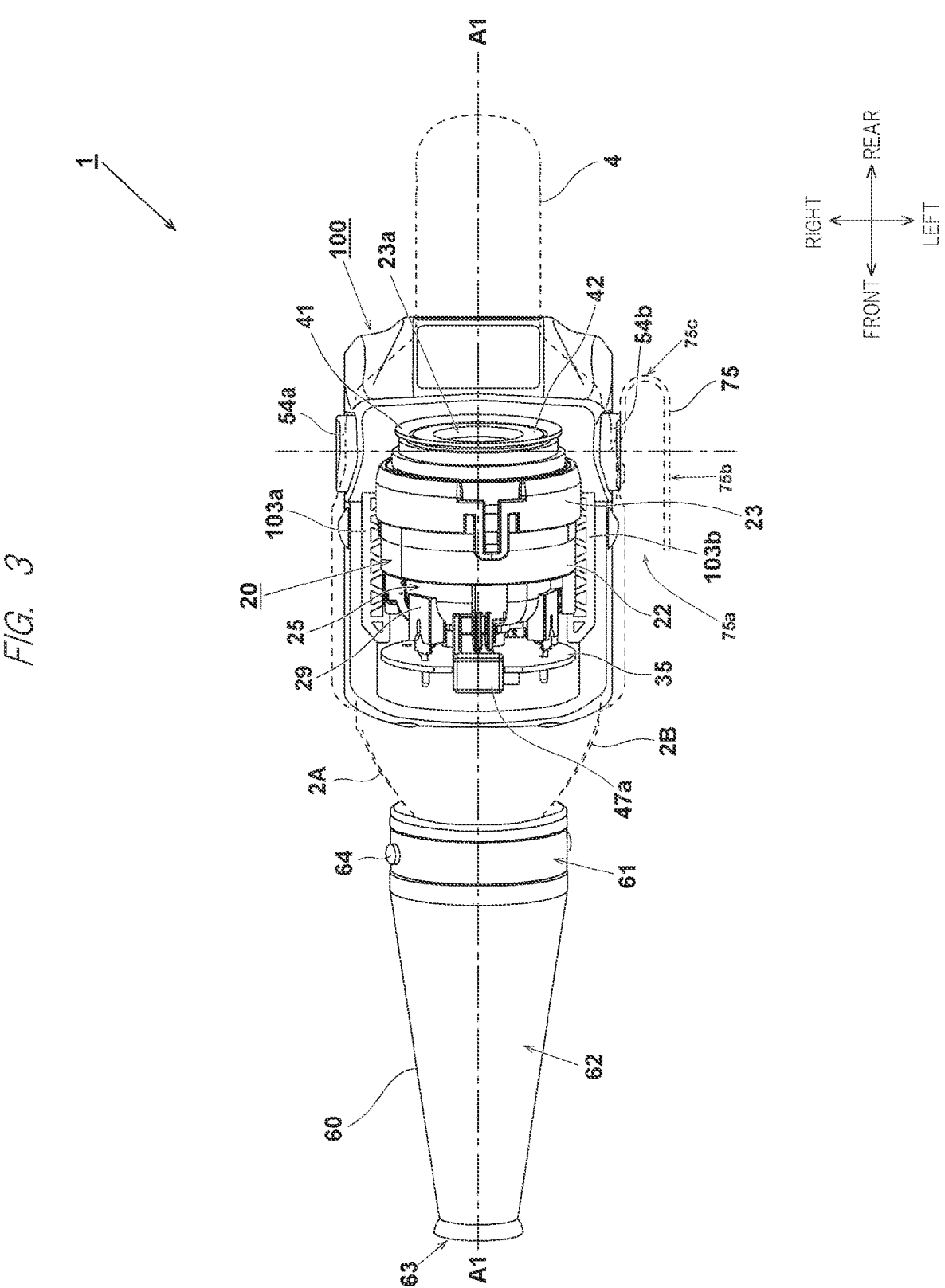
FIG. 3 is a top perspective view illustrating a situation of a motor unit 20 in the blower 1 illustrated in FIG. 2.

FIG. 3 is an arrangement diagram (an upper surface portion) of the motor unit 20 in the blower 1. A right divided piece 2A and a left divided piece 2B forming the housing 2, excluding respective portions of screw bosses 17*a* to 17*b* (see FIG. 2), are formed to be bilaterally symmetrical with respect to a vertical division surface. The housing 2 that is indicated by a dotted line has a left-right width that is slightly larger than that of the motor unit 20. The motor unit 20 is configured to be arranged within an arrangement range of the battery pack 100 in a top view, i.e., within a range in the left-right direction and a range in the front-rear direction of the same. When viewed from the top as described above, all of the fan, the motor, and the motor circuit board 36 are within an outer edge range of the battery pack 100. In such an arrangement, the heaviest component (that is the motor unit 20) among components on the main body side of the blower 1 is arranged at a position close to the center (front-rear center, left-right center) of the blower 1, and therefore, the blower 1 that is conveniently used because of mass concentration can be achieved.

In the battery pack mounting section 6 (see FIG. 1 for its reference symbol), the rail grooves 103*a* and 103*b* that respectively engage with rail sections 58*a* and 58*b* (see FIG. 2) formed on the housing 2 side are formed. As can be seen in FIG. 3, the left-right center position of the motor unit 20 in the present embodiment coincides with a left-right center position of the rail grooves 103*a* and 103*b*. These left-right center positions are located on a vertical plane passing through the center axial line A1 of the air exhaust pipe 12. In FIG. 3, a state where the hook 75 is mounted on the left side is indicated by a dotted line. In the hook 75 having a substantially U shape, an opening 75*a* is on the front side, an extension section on one side (the outer side) of the sub-stantially U shape is a claw section 75*b*, and a bottom portion of the substantially U shape is a locking section 75*c*. An attachment position of the hook 75 is located within a range in the front-rear direction of the battery pack 100, and is configured to easily cause the well balanced state at the time of the hanging of the blower 1.

Figure 4:
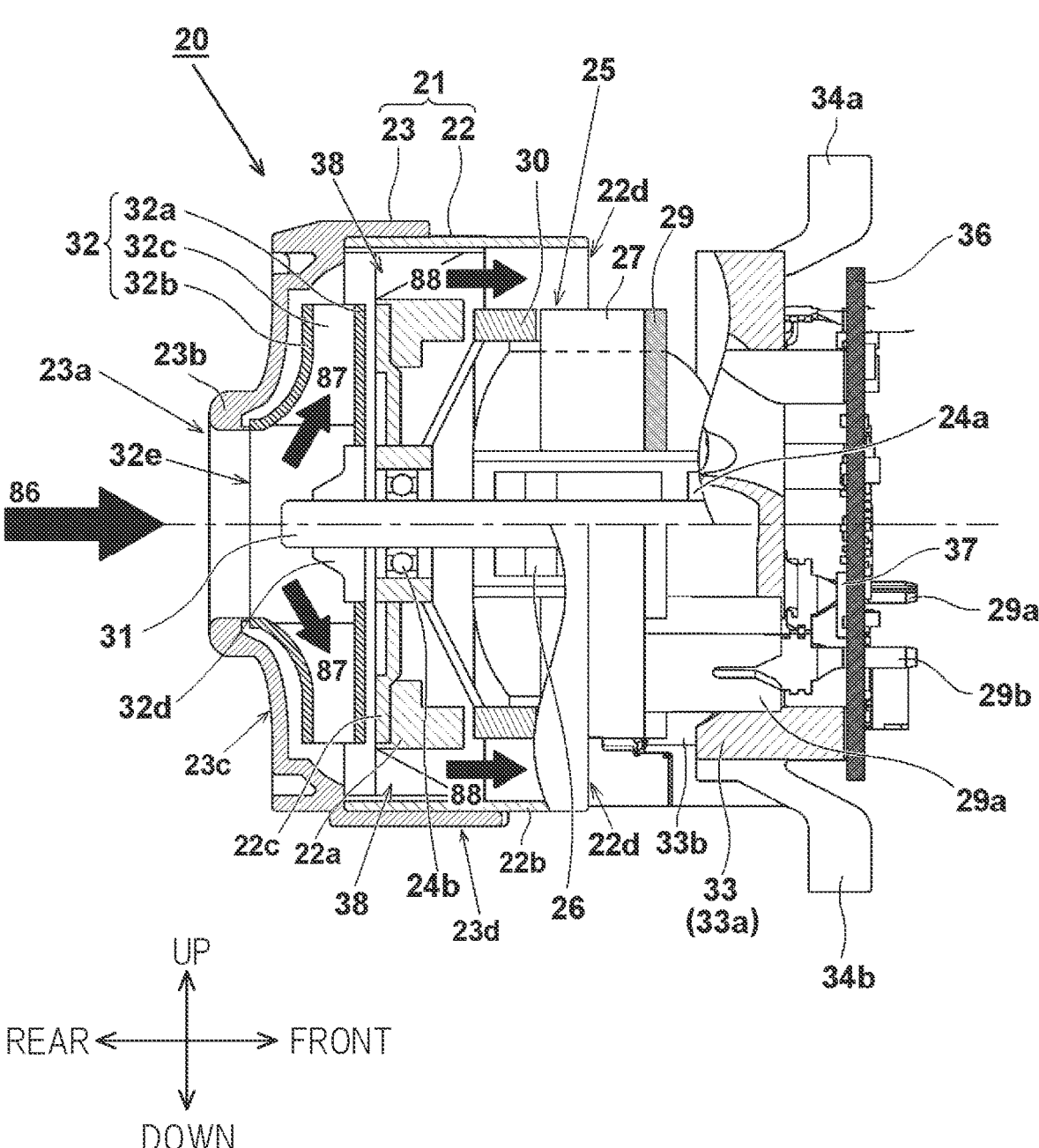
FIG. 4 is a vertical cross-sectional view of the motor unit illustrated in FIG. 2.

FIG. 4 is a vertical cross-sectional view of the motor unit 20 in the blower 1. The motor unit 20 is a unitized assembly of the motor 25, the fan 32, and the motor circuit board 36. Here, the air intake port 23*a* is arranged on the rear side of the blower 1, i.e., on the opposite side to the nozzle 60 across the motor 25, and the fan 32 is arranged between the motor 25 and the air intake port 23*a*. A brushless DC type motor 25 is arranged inside the metallic motor case 21 in the motor 25, a rotor 26 having a permanent magnet is fixed to a rotation shaft 31, and a stator core 27 is arranged around the rotor 26. The stator core 27 has three magnetic poles made of a laminated iron core, and includes, on the front and rear sides, insulators 29 and 30 made of synthetic resin and having substantially the same shape in cross section as that of the magnetic poles to be bonded in the rotation axial line direction, and a stator coil is formed by winding an enamel wire around the insulator 29, the stator core 27, and the magnetic poles of the insulator 29. Thea rotation shaft 31 of the motor 25 is pivotally supported by bearings 24*a* and 24*b* on the front side and the rear side of the stator core 27. The front bearing 24*a* is held by an attachment member 33, and the rear bearing 24*b* is held by a rear wall section 22*c* attached to the rear side of the main case 22.

The motor circuit board 36 for controlling the rotation of the motor 25 is provided on the front side of the stator core 27. The motor circuit board 36 is a multi-layer substrate having a substantially circular shape, and a large number of electronic elements such as a capacitor and a semiconductor switching element 37 are mounted on its front surface (on the front side) and its rear surface (on the rear side). Although only partially illustrated in the drawing, six FETs (field effect transistors) are mounted as the semiconductor switching element 37 on the motor circuit board 36. The motor circuit board 36 is fixed to the stator core 27 by the attachment member 33. The attachment member 33 is a molded product of an aluminum alloy, and has a cylindrical section 33*a*. Screw bosses 33*a* to 33*c* (only 33*b* is visible in the drawing) used for the fixation to the stator core 27 are provided on the rear side of the cylindrical section 33*a*. In the attachment member 33, two arm sections 34*a* and 34*b* respectively extending in an upward direction and a down-ward direction are formed for the fixation of the motor unit 20 to the housing 2. The arm sections 34*a* and 34*b* are formed to be unified with the attachment member 33. Each of the arm sections 34*a* and 34*b* extends obliquely forward from two portions at an outer edge of the cylindrical section 33*a* of the attachment member 33, and then, extends in the upward direction or the downward direction in the vicinity of the outside in a radial direction of the motor circuit board 36. The vicinities of distal ends of the arm sections 34*a* and 34*b* are respectively claw sections for the fixation to the housing 2, and the arm sections 34*a* and 34*b* are respectively fixed to recesses 9*a* and 9*b* (see FIG. 2) of the housing 2 while rubber bushes 47*a* and 47*b* (see FIG. 1 for both of them) are covered on the vicinities of the distal ends.

The brushless motor is rotatable at high revolutions, and, for example, the number of revolutions equal to or more than about 80,000 revolutions per second can be achieved. If a related-art brushed direct-current motor is used, the number of revolutions of the motor 25 is at most about thirty and several thousand revolutions. In the present embodiment, since the brushless DC motor is adopted, 80,000 revolutions per second is achieved in the case of the "strong-level" driving of the motor 25, and 40,000 revolutions per second is achieved in the case of the "weak-level" driving of the same. Since the number of revolutions of the motor at the time of such operation of the blower 1 is set to a high speed such as 40,000 revolutions per second or more, a sufficient air volume can be achieved while a small fan 32 fitted into the casing of the motor unit 20 is used. For example, when a portion having the smallest inner diameter in the nozzle 60 is modified to have an inner diameter of 7 to 9 mm, the motor 25 can rotate the fan such that the air speed is 130 meters per second or more. In the present embodiment, note that the type of the motor 25 is optional. A motor other than the brushless DC motor may be adopted if it can be housed in the motor case 21 and can rotate the fan 32 at a desired high speed.

The motor case 21 is made of a main case 22 and a fan case 23 mounted on the rear side thereof. The main case 22 is configured to include an inner cylindrical section 22*a* formed to have substantially the same diameter as that of the stator core 27, an outer cylindrical section 22*b*, and the rear wall section 22*c* that connects respective vicinities of rear ends of the outer cylindrical section 22*b* and the inner cylindrical section 22*a* to each other in the radial direction. That is, the outer cylindrical section 22*b* and the inner cylindrical section 22*a* are circular in the cross-sectional shape when viewed in the center axial line direction. The rear wall section 22*c* is made of not entirely of a wall surface but approximately a formed portion to be a support for the connection between the inner cylindrical section 22*a* and the outer cylindrical section 22*b*, and becomes, except for the support portion, an air blow passage 38 that penetrates from the rear to the front in the rotation axial line A1 direction. The rotation shaft 31 protrudes rearward in the center axial line A1 direction behind the rear wall section 22*c* in the main case 22, and the fan 32 is attached to a distal end of the rotation shaft 31 by a bush 32*d*. The fan 32 is a centrifugal fan, and a plurality of blades 32*c* are manufactured by integral molding of synthetic resin between a disk 32*a* on the front side and a conical wall 32*b* on the rear side. A circular suction port 32*e* is formed in an axial center portion of the conical wall 32*b*.

The fan case 23 includes the air intake port 23*a* that is formed in the vicinity of a center axis of a rear wall surface, includes a cylindrical section 23*b* that is formed around the air intake port 23*a*, and includes a gentle circular arc-shaped rear wall surface 23*c* between the cylindrical section 23*b* and an outer cylindrical section 23*d*. Since the fan case 23 is attached to the main case 22 as described above, a space where the fan 32 rotates is defined between the main case 22 and the fan case 23. By the rotation of the fan 32, the air is sucked from the rear side of the rotation axial line of the motor 25 (the arrow 86), and flows outward in the radial direction as indicated by an arrow 37 through between wings 32*c* to be exhausted from the fan 32. The air exhausted from the fan 32 is guided to respective inner wall portions of the fan case 23 and the main case 22, flows inside the air blowing passage 38 in a direction indicated by an arrow 88, and is exhausted from, the exhaust port 22*d* serving as the opening on the air exhaust side of the main case 22 to a space out of the motor case 21.

The motor case 21 is a molded product of synthetic resin and is fixed to an attachment rib 40 (see FIG. 2) having a part fixed to a part of a cylindrical case of the motor 25 and having a part on the outer periphery side formed in an inner wall portion of the housing 2. That is, the motor case 21 plays a role of a function of a fan guide that defines the rotation space of the fan 32 and a function of a motor holding member for fixing the motor 25 to the housing 2. An outer peripheral surface and the rear side of the fan 32 are covered with the motor case 21.

The air exhausted from the exhaust port 22*d* of the motor case 21 flows forward along an outer peripheral surface of the stator core 27, and is exhausted forward after passing through the outside of the attachment member 33 in a radial direction and the outside of the motor circuit board 36 in the radial direction. The air that has passed through the inside of the motor case 21 housing the motor 25 and the fan 32 as described above is exhausted forward from the exhaust port 22*d*. The outer diameter of the fan 32 is expressed as "$D_f$" (43 mm). Note that the outer diameter of the fan 32 is preferably equal to or larger than 38 mm and equal to or smaller than 50 mm.

Figure 5:
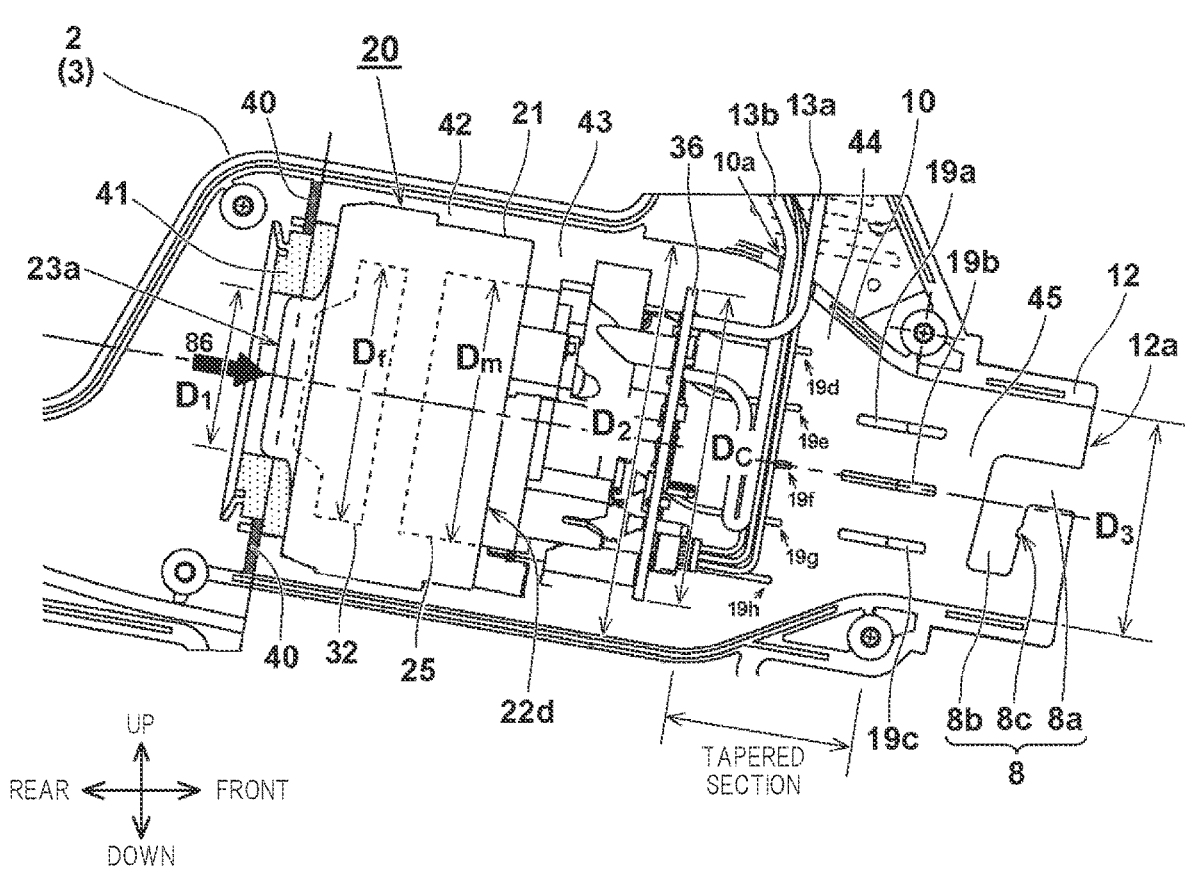
FIG. 5 is a diagram obtained by extracting the vicinity of the motor unit 20 illustrated in FIG. 2 and a diagram for describing a relationship between a motor 25 and a size of an air path.

FIG. 5 is a diagram obtained by extracting the vicinity of the motor unit 20 illustrated in FIG. 2, and is a diagram for explaining a relationship between the motor 25 and the size of the air path. Description of some sections such as the recesses 9*a* and 9*b* (see FIG. 2) of the housing 2 is omitted. When a rubber bush 41 is made to interpose on the outer periphery side of the air intake port 23*a*, the motor unit 20 is held by the attachment rib 40 protruding from, a wall surface of the main body section 3 in the housing 2 toward the center axial line A1. In the drawing, a hatching line is attached to make a range of the attachment rib 40 recognizable. The rubber bush 41 has a cylindrical shape performing a function of fixing the rear end portion of the motor unit 20 to the housing 2 and a function of a damping member for preventing propagation of vibration to be generated by the motor unit 20 toward the housing 2 side. Further, the rubber bush 41 can be utilized as a fixture that fixes a mesh (not illustrated; a mesh pitch is, for example, about 1 to 2 mm, and is made of a metal or synthetic resin) for preventing large dirt or the like from entering the air intake port 23*a*. Various methods for fixing the mesh are considerable. However, the mesh may be, for example, casted into the rubber bush 41. Alternatively, the mesh may be configured to be detachable from the rubber bush 41 or be fixed by a different fixing method.

The motor unit 20 is attached to the housing 2 to have gaps 42 to 44 between its outer peripheral surface and the housing 2. A portion between the outside of the motor case 21 and the housing 2, i.e., between the exhaust port 22*d* and the attachment rib 40 is not actively utilized as the air path. Accordingly, the gap 44 between the motor case 21 and the housing 2 may be further narrowed, or an elastic member such as a sponge may be interposed therebetween. The air sucked from the air intake port 23*a* into the motor unit 20 is exhausted from the exhaust port 22*d* to a portion of the gap 43 after passing between the inner cylindrical section 22*a* (see FIG. 4) and the outer cylindrical section 22*b* (see FIG. 4) of the motor case 21. The diameter of the air intake port 23*a* is expressed as "$D_1$"(17 mm). A housing space of the motor unit 20 is a cylindrical space having a diameter $D_2$ (61 mm) substantially constant on the front side of the attachment rib 40 in the center axial line A1. The outer diameter of the fan is preferably within 1.5 times the outer diameter of the stator. The inner diameter of the motor unit 20 in a portion where the motor case 21 is positioned is also constant. The motor circuit board 36 formed in a substantially circular shape has a diameter $D_c$. The diameter $D_c$ (48 mm) is in such a relationship as to be larger than a diameter Dm (40 mm) of the stator core 27 of the motor 25 and smaller than the diameter (the inner diameter) $D_2$ of the housing space. A ratio of $D_f$ to $D_m$ is preferably about 0.8 times to 1.2 times.

On the front side of the motor unit 20, the air path has a tapered section that narrows to have a tapered shape formed therein to increase the flow rate of the air to be discharged from the exhaust port 22*d*. That is, an outer wall surface of a portion (tapered section) of the space 44 is formed to be conically narrowed. A portion of a space 45 as the inner side of the air exhaust pipe 12 becomes the cylindrical air path again, and a front opening of the space 45 becomes the air exhaust port 12*a*. In this case, the inner diameter (diameter) of the air exhaust pipe 12 is expressed as "$D_3$"(23 mm), and a relationship of "$D_2 > D_c > D_f > D_m > D_3 > D_1$" holds. As described above, the diameter $D_c$ of the motor circuit board 36 is made larger than the diameter Dm of the stator core 27, and besides, the motor circuit board 36 does not have a through hole in the vicinity of its center, and therefore, the mounting area of the motor circuit board 36 can be sufficiently ensured, and the inverter circuit can be easily mounted on the motor circuit board 36. The motor circuit board 36 is arranged in a portion exposed to the lower side of the blowing from the fan 32, and the semiconductor switching element is mounted thereon. Thus, the cooling efficiency of the semiconductor switching element can be increased. Further, the wirings 13*a* and 13*b* can be connected from the motor circuit board 36 to the control circuit board 55 (see FIG. 2) through the partition wall 10, and therefore, the wiring can be efficiently made at a short distance.

Ribs 19*a* to 19*c* are provided in the vicinity of the space 44. The ribs 19*a* to 19*c* extend from the inner wall portion of the housing 2 toward the vertical plane (=the division surface of the housing 2) passing through the center axial line A1, and are formed at the same time of the molding of the housing 2. The ribs 19*a* to 19*c* have a function of preventing entering of a hand or foreign substances thereinto from the air exhaust port 12*a* at the time of the detachment of the nozzle 60 in addition to a function of rectifying the air flow. The ribs 19*a* to 19*c* extending from the left side and the ribs 19a to 19c extending from the right side of the housing 2 are formed to be bilaterally symmetrical to each other across the division surface, and come close to each other in the vicinity of the division surface at a predetermined distance, i.e., at a close distance as preventing the operator's finger from entering thereinto. Note that distal ends of the ribs 19a to 19c extending from the right and left inner wall surfaces toward the division surface may be configured to be in contact with each other.

The air exhaust port 12a is arranged on the front side of the housing 2. The housing 2 is formed by combining a half-cylindrical portion of the right divided piece 2A and a half-cylindrical portion of the left divided piece 213 together. An attachment section 8 having an L shape in a side view is formed on an inner peripheral surface of each of the half-cylindrical portions. The similar attachment section 8 is also arranged in the right divided piece of the housing 2 to be rotationally symmetrical around the center axial line A1, although only its portion formed in the left divided piece of the housing 2 is visible in FIG. 5. The attachment section 8 is made of an axially notched section 8a extending in the center axial line. A1 direction from an opening surface of the air exhaust port 12a and a circumferentially notched section 8b bent at a right angle in the circumferential direction from the vicinity of a rear end of the axially notched section 8a and extending by an amount corresponding to a circumferential angle of about 90 degrees in the circumferential direction. On the other hand, as illustrated in FIG. 3, the cylindrical connection section 61 of the nozzle 60 includes the protrusions 64 at positions inside the attachment section 8, the positions being spaced apart in the circumferential direction by 180 degrees. To attach the nozzle 60, the positions of the protrusion 64 of the nozzle 60 and the attachment section 8 are made to coincide with each other, and then, the nozzle 60 is pushed in the axial direction and is relatively rotated in the circumferential direction. A convex section 8c for latch is formed in a part of the circumferentially notched section 8b so that the protrusion 64 formed in the nozzle 60 is stably positioned at a final end portion of the circumferentially notched section 8b.

Figure 6:
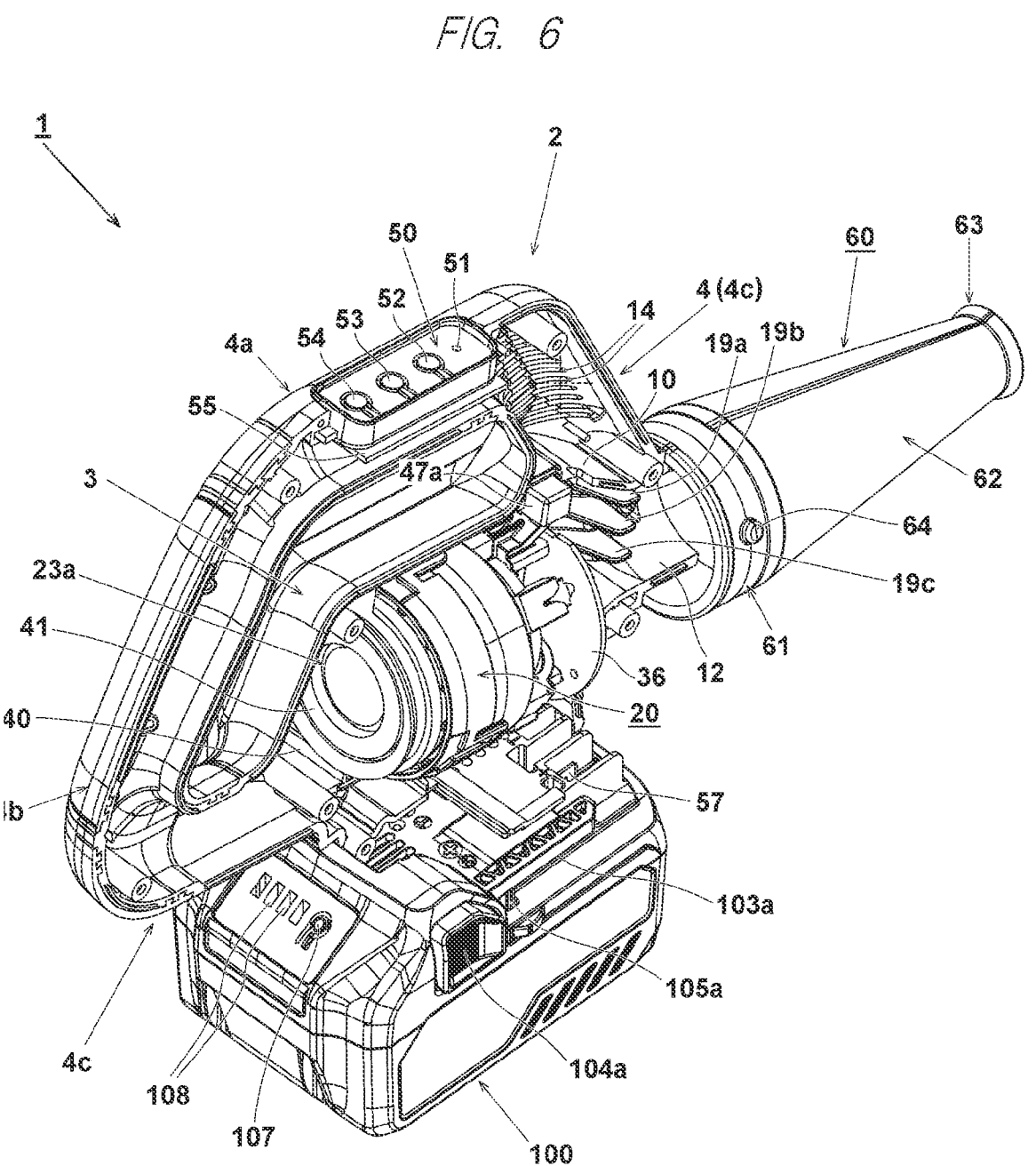
FIG. 6 is an exposed perspective view of the blower 1 illustrated in FIG. 1.

FIG. 6 is an exploded perspective view of the blower 1. Here, FIG. 6 illustrates a state of the housing 2 from which the right divided piece is detached and which includes only the left divided piece. The motor unit 20 is housed inside the main body section 3 of the housing 2, and its front upper side is held by the housing 2 via the rubber bush 47a. Although not visible in FIG. 6, the front lower side of the motor unit 20 is held by the housing 2 via the rubber bush 47b (see FIG. 2). The rear side of the motor unit 20 is held by the attachment rib 40 of the housing 2 while using the cylindrical rubber bush 41. When the motor unit 20 is embedded into the housing 2, the assembly previously assembled as illustrated in FIG. 4 is sandwiched by the left-right division-type housing 2, and therefore, the assembly performance is good.

The air exhausted from the exhaust port 22d in the motor unit 20 passes around the motor circuit board 36, and flows toward the nozzle 60. Here, the motor circuit board 36 is substantially circular, and has a shape having no opening hole in the vicinity of its center. When the motor circuit board 36 is not made completely circular but so elliptical as to slightly extend toward both the left and right sides, large electronic elements such as a semiconductor switching element (not illustrated) constituting the inverter circuit and an electrolytic capacitor (not illustrated) can be mounted on the motor circuit board 36. A through hole for the penetration from the front side to the rear side of the substrate is not formed in the vicinity of the center axial line A1 of the motor circuit board 36, and therefore, almost all of the electronic elements other than a microcomputer for controlling the rotation of the motor can be mounted on the motor circuit board 36.

The ribs 19a to 19c extending in parallel to the center axial line A1 are formed on the front side of the motor circuit board 36. The ribs 19a to 19c are formed in a portion closer to the motor unit 20 than the air exhaust pipe 12, i.e., the air path portion narrowed to have the tapered shape.

The battery pack 100 is mounted just below the motor unit 20. In the battery pack, the rail groove 103a arranged in parallel to the left-right direction is formed. The rail groove 103a is a portion formed by recessing a right side surface of the battery pack 100 in a concave shape. A front end portion of a recessed groove portion is opened, a rear end portion of the groove portion is closed, and a latch pawl 105a is formed in the vicinity of the rear end portion. A rear upper portion of the battery pack 100 is provided with a battery check switch 107. The operator can check the remaining amount of the battery pack 100 by pushing the switch 107 to light up LEDs 108, the number of which corresponds to a battery voltage. FIG. 6 illustrates a part of the main body-side connection terminal 57. The number of the main body-side connection terminal 57 being a metal plate extending in the front-rear and up-down directions is plural, these terminals are arranged in the left-right direction, and are fitted with the battery-side terminal section 106 (not visible in the drawing) when distal ends of the main body-side connection terminals 57 are inserted into the upper case 101 at the time of the mounting of the battery pack 100.

The switch panel 50 serving as an operation section of the blower 1 is provided with the tactile switches 53 and 54 serving as an ON switch (strong, weak) of the motor 25, and the tactile switch 52 serving as an OFF switch is assigned thereto. When the tactile switches 53 and 54 are pushed once as described above, an ON-lock state is maintained until the OFF switch (the tactile switch 52) is pushed. Further, since the self-standing of the blower 1 is achieved by the battery pack 100, the air blowing work can be performed in a state in which the blower 1 is placed on the desk top or the floor surface without being gripped by the operator. An LED 51 lights up during the rotation of the motor 25. A control circuit board 55 is provided on the lower side of the switch panel 50, and the control section that controls 30 the rotation of the motor 25 is mounted thereon. The control section controls an inverter circuit that outputs an excitation current for rotating the motor 25. The motor circuit board 36 having the inverter circuit as described above is provided on the motor unit 20 side while the control section that controls the inverter circuit is mounted on the control circuit board 55, and therefore, the mounting efficiency is improved, and besides, the manufacturing efficiency is improved since the necessary components for the motor 25 and the fan 32 can be pre-assembled as the motor unit 20. An electric circuit that controls the blower 1 is mounted separately from the motor circuit board 36, and therefore, even when the blower 1 is provided with a new additional value other than the rotation of the motor or additional electric control means, the blower 1 can be easily achieved by only changing the configuration on the control circuit board 55 side. Further, the motor circuit board 36 can be mounted so as not to compress the air blowing passage. Therefore, the mounting space of the motor circuit board 36 can be ensured while the housing 2 is downsized.

The inside of the nozzle 60 has a diameter to be smaller from the rear side toward the front side along the center axial line A1. Accordingly, the air is collected in the vicinity of the center axial line A1, and is exhausted outward from the nozzle 60 in a state in which its flow rate is further increased. A minimum value of the inner diameter of the nozzle 60 is 15.5 mm. The motor 25 can rotate the fan 32 such that its air volume is 1.02 m³/minute while its air speed is 110.6 m/second at maximum in the state of the nozzle. 60 attached to the housing 2 (the air volume and the air speed have been calculated based on a method defined in ANSI B175.2). That is, the motor 25 can drive the fan such that a ratio of the air speed (unit: m/second) to the air volume (unit: m³/minute) is 108 times. And, the motor 25 can rotate the fan 32 such that the air volume is 0.16 m³/minute while the air speed is 185.6 m/second at maximum in a state of a nozzle having an inner diameter, a minimum value of which is 8.0 mm, but not illustrated attached to the housing 2. That is, the motor 25 can drive the fan such that the ratio of the air speed (unit: m/second) to the air volume (unit: m³/minute) is 403 times. In a state of the detachment of the nozzle, note that the motor 25 can rotate the fan 32 such that the air volume is 1.33 m³/minute while the air speed is 30.2 m/second at maximum. That is, the motor 25 can drive the fan such that the ratio of the air speed (unit: m/second) to the air volume (unit: m³/minute) is 23 times. Thus, because of the presence/absence of the nozzle or the diameter change, the motor 25 can drive the fan such that the ratio of the air speed (unit: m/second) to the air volume (unit: m³/minute) is in a range equal to or more than 20 times and less than 500 times, and more specifically equal to or more than 80 times and less than 500 times. The fan can be driven such that the air volume in the case of the attachment of the nozzle is equal to or more than 3.5 times and less than 6.5 times that of the case of the detachment of the nozzle.

Figure 7:
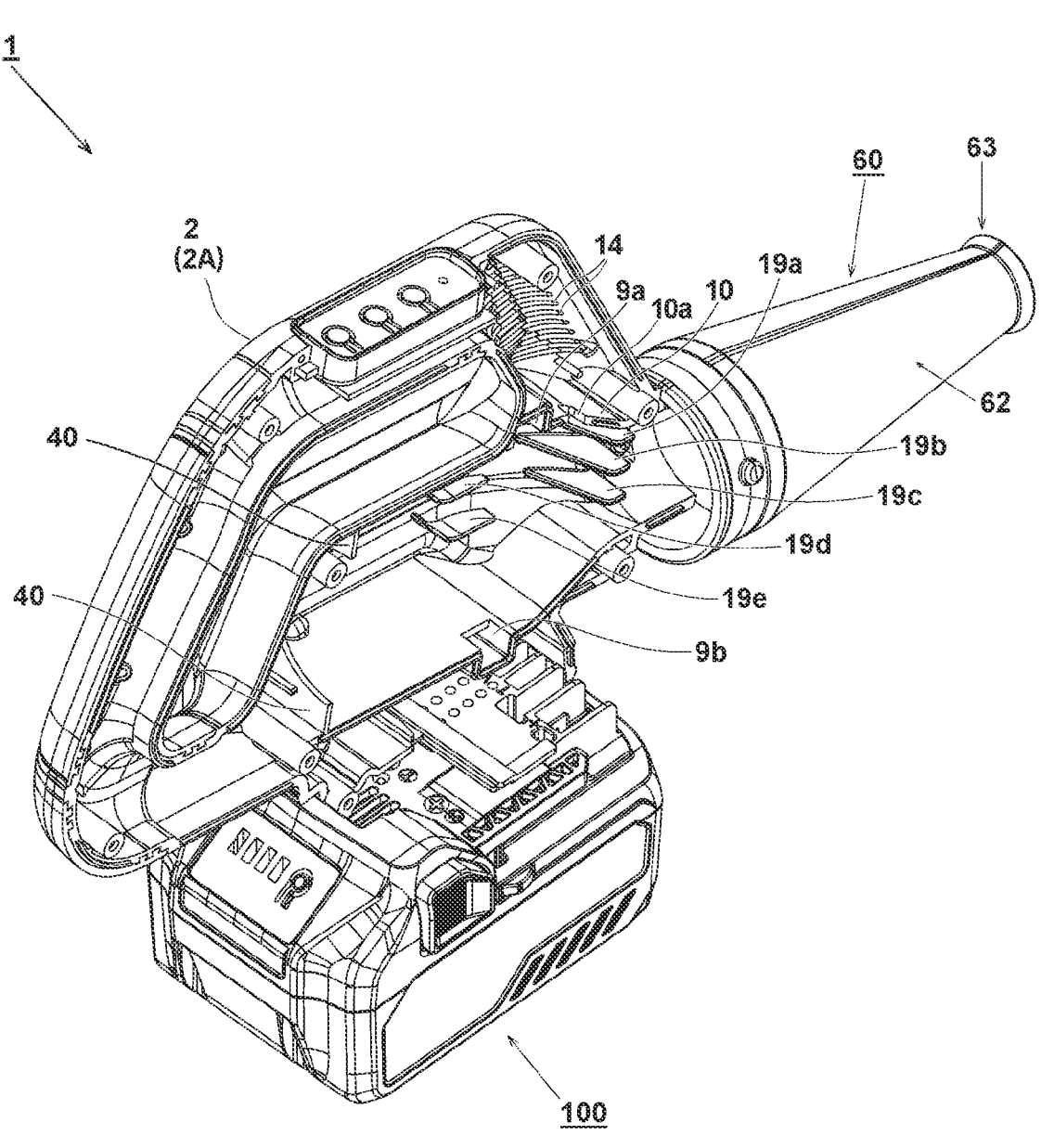
FIG. 7 is an exploded perspective view illustrating a state where the motor 25 is detached from a state illustrated in FIG. 6.
Figure 8:
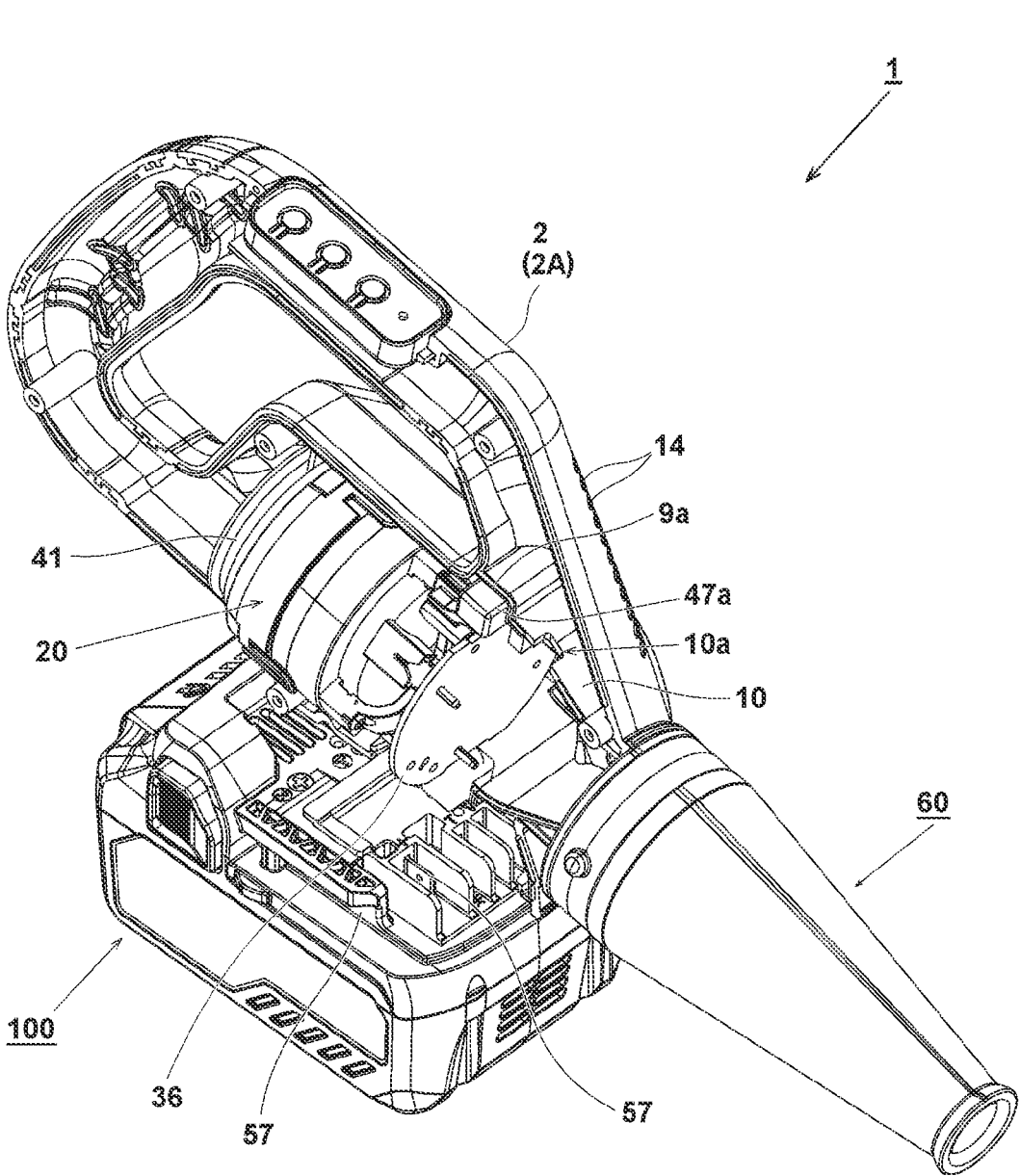
FIG. 8 is an exploded perspective view illustrating the state illustrated in FIG. 6 viewed in another direction.

FIG. 7 is an exploded perspective view illustrating a state of the detachment of the motor unit 20 from the state illustrated in FIG. 6. The recess 9a is formed in an inner upper portion of the main body section 3 of the left divided piece of the housing 2, and the recess 9b is formed in an inner lower portion of the same. The recess 9a and the recess 9b are respectively spaces that house the rubber bushes 47a and 47b illustrated in FIG. 2. Although the right divided piece of the housing 2 is not illustrated in FIG. 7, the recesses 9a and 9b are also similarly formed in the right divided piece. Five ribs 19d to 19h for rectifying the air flow are formed in a portion inside the main body section 3, the portion being a left gap portion of the motor unit 20 (the ribs 19d to 19f are not visible in the drawing). The ribs 19d to 19f are also formed in a portion inside the main body section 3, the portion being a right gap portion of the motor unit 20. The recess 9a and the recess 9b are arranged to straddle the right divided piece 2A and the left divided piece 2B of the housing 2 as described above, and the rubber bushes 47a and 47b are also accordingly arranged to straddle the right divided piece 2A and the left divided piece 2B. Therefore, the motor unit 20 can be easily embedded into the main body section 3, and the assembly efficiency can be improved. The partition wall 10 having the through hole 10a at its center is formed in a portion on the rear side inside the main body section 3 of the housing 2, The air intake port 14 of the suction passage is formed on the upper side of the partition wall 10.

FIG. 3 is an exploded perspective view of the blower 1 in the state illustrated in FIG. 7 as viewed in another direction. Since the vicinity of the center of the motor circuit board 36 is not provided with the through hole through which the air can pass, the entire air exhausted from the motor case 21 is exhausted 20 to the nozzle 60 through the radial direction outside of the motor circuit board 36. An outer shape of the rubber bush 47a is substantially rectangular, and has a size as to extend from the left divided piece 2B to the right divided piece 2A of the housing 2.

In the foregoing, the present invention of the present application has been concretely described on the basis of the embodiments. However, the present invention is not limited to the foregoing embodiments, and various modifications can be made within the scope of the present invention. The present invention is also applicable to a blower having a different configuration from that in the present embodiment if the blower includes the main body section 3 and the air exhaust port (or an air exhaust passage) narrowed toward the front side formed therein.

EXPLANATION OF REFERENCE CHARACTERS

1 . . . blower, 2 . . . housing, 2A . . . right divided piece, 2B . . . left divided piece, 3 . . . main body section, 4 . . . handle section, 4a . . . upper gripping section (of handle section), 4b . . . rear gripping section (of handle section), 4c . . . front connection section (of handle section), 4d . . . lower connection section (of handle section), 4e . . . uneven surface (of handle section), 5 . . . through section, 6 . . . battery pack mounting section, 8 . . . attachment section, 8a . . . axially notched section, 8b . . . circumferentially notched section, 8c . . . convex section, 9a, 9b . . . recess, 10 . . . partition wall, 10a . . . through hole, 12 . . . air exhaust pipe, 12a . . . air exhaust port, 13a, 13b . . . wiring, 14 . . . air intake port, 16a, 16b . . . wiring, 16c . . . signal line, 17a to 17h . . . screw boss, 19a to 19h . . . rib, 20 . . . motor unit, 21 . . . motor case, 22 . . . main case, 22a . . . inner cylindrical section, 22b . . . outer cylindrical section, 22c . . . rear wall section, 22d . . . exhaust port, 23 . . . fan case, 23a . . . air intake port, 23b . . . cylindrical section, 24a, 24b . . . bearing, 25 . . . motor, 26 . . . rotor, 27 . . . stator core, 29 . . . insulator, 30 . . . insulator, 31 . . . rotation shaft, 32 fan, 32a . . . disk, 32b . . . conical wall, 32c . . . wing, 32d . . . bush, 32e . . . suction port, 33 . . . attachment member, 33a . . . cylindrical section, 33b . . . screw boss, 31a, 34b . . . arm section, 36 . . . motor circuit board, 37 . . . semiconductor switching element, 38 . . . air blowing passage, 40 . . . attachment rib, 41 . . . rubber bush, 42 to 46 . . . gap, 47a, 47b . . . rubber bush, 50 . . . switch panel (operation section), 51 . . . LED, 52 to 54 . . . tactile switch, 55 . . . control circuit board, 56 . . . main body-side terminal holder, 57 . . . main body-side connection terminal, 58a, 58b . . . rail section, 60 . . . nozzle, 61, cylindrical connection section, 62 . . . tapered section, 63 . . . distal end section, 64 . . . protrusion, 65 . . . discharge port, 75 . . . hook, 75a . . . opening (of hook), 75b . . . claw section (of hook), 75c . . . locking section (of hook), 76 . . . screw, 81 to 93 . . . air flow, 96 . . . center-of-gravity position of main body section, 97 . . . entire center-of-gravity position, 98 . . . center-of-gravity position of battery pack, 100 . . . battery pack, 101, 102 . . . case, 103a, 103b . . . rail groove, 104a, 104b, . . . latch button, 105a . . . latch pawl, 106 . . . battery-side terminal section, 107 . . . switch, 108 . . . LED, A1 . . . center axial line (of discharge port 12a)

The invention claimed is:

1. A blower comprising:

a housing including an air intake port configured to suck air flow thereinto and an air exhaust pipe including an air exhaust port forming a singular through hole configured to exhaust out the air flow; and an assembly housed inside the housing, wherein the assembly includes:

a motor including a rotor, a stator, and a driving shaft rotating together with the rotor;

a fan fixed to the driving shaft and configured to generate the air flow;

a motor case configured to house the fan and at least a part of the motor; and a motor circuit board disposed outside the motor case and configured to control the motor, wherein, the air exhaust port is disposed on an axial line of the driving shaft, wherein the motor is disposed between the air exhaust port and the fan in an axial-line direction of the driving shaft, wherein the motor circuit board is disposed between the motor and the air exhaust port, wherein the fan is a centrifugal fan having multiple blades, a diameter of the centrifugal fan, centered on the axial line of the driving shaft, is smaller than a diameter of the motor circuit board, and a radial dimension of the fan axially overlaps with a radial dimension of the stator, wherein the motor case forms an air blowing passage where the air that is exhausted from the fan flows along an outer peripheral surface of the stator, wherein the motor circuit board extends in a direction intersecting the axial line, and a portion of the motor circuit board is positioned in a region on an axial extension of the air blowing passage in the axial-line direction and at a downstream side of the stator, and wherein a diameter of the singular through hole is smaller than a diameter of the motor circuit board.

2. The blower according to claim 1, wherein the motor case includes an internal air intake port, and wherein the blower further comprises a filter coupled to the air intake port of the housing and a mesh covering the internal air intake port arranged inside the housing.

3. The blower according to claim 1, wherein a battery pack mounting section to which a battery pack is attachable is formed below the housing, and wherein the blower is a freestanding blower in a state in which a bottom surface of the battery pack is in contact with a floor surface.

4. The blower according to claim 3, wherein, when viewed from the top, the fan and the motor are within an outer edge of the battery pack.

5. The blower according to claim 1, wherein the housing includes:

a main body section configured to house the motor; and a handle section configured to at least partially extend in a direction intersecting the axial-line direction of the driving shaft, and wherein the air intake port is coupled to the handle section.

6. The blower according to claim 1, wherein the housing includes:

a main body section configured to house the motor; and a handle section configured to at least partially extend in a direction intersecting the axial-line direction of the driving shaft, wherein the motor circuit board includes an inverter circuit configured to output electric current to the motor, and wherein a control circuit board configured to include a microcomputer mounted thereon and to control the inverter circuit is coupled to the handle section.

7. The blower according to claim 1 further comprising a tubular nozzle detachably attached to the air exhaust pipe.

8. The blower according to claim 1, wherein the assembly includes an arm fixed to the stator, wherein the arm extends in a radial direction of the driving shaft outward and axially downstream from the region, and wherein an end of the arm is disposed in a position that overlaps the motor circuit board in the radial direction of the driving shaft and is supported by the housing.

9. The blower according to claim 1 further comprising a tubular nozzle detachably attached to the air exhaust pipe, wherein the exhaust pipe is cylindrical and centered on the axial line, and wherein the housing includes:

a large diameter portion that houses the motor and the motor circuit board and that has a larger diameter than the air exhaust pipe; and a tapered portion that connects the large diameter portion to the air exhaust pipe.

10. A blower comprising:

a housing including an air intake port configured to suck air flow thereinto and an air exhaust pipe including an air exhaust port forming a singular through hole configured to exhaust out the air flow; and an assembly housed inside the housing, wherein the assembly includes:

a motor including a rotor, a stator, and a driving shaft rotating together with the rotor;

a fan fixed to the driving shaft and configured to generate the air flow;

a motor case configured to house the fan and at least a part of the motor; and a motor circuit board disposed outside the motor case and configured to control the motor, wherein, the air exhaust port is disposed on an axial line of the driving shaft, wherein the motor case includes an internal air intake port disposed on the axial line of the driving shaft, wherein the motor is disposed between the air exhaust port and the fan in an axial-line direction of the driving shaft, wherein the motor circuit board is disposed on the axial line of the driving shaft, wherein the fan is a centrifugal fan having multiple blades, and a radial dimension of the fan axially overlaps with a radial dimension of the stator, wherein the motor case forms an air blowing passage where the air that is exhausted from the fan flows along an outer peripheral surface of the stator, wherein the motor circuit board extends in a direction intersecting the axial line, and a portion of the motor circuit board is positioned in a region on an axial extension of the air blowing passage in the axial-line direction, and wherein a diameter of the singular through hole is smaller than a diameter of the motor circuit board.

11. The blower according to claim 10, wherein a diameter of the internal air intake port, centered on the axial line of the driving shaft, is smaller than a diameter of the stator.

12. The blower according to claim 10,
wherein the assembly is held inside the housing by a first elastic body disposed on one side in an axial-line direction of the driving shaft and a second elastic body disposed on another side in the axial-line direction of the driving shaft, with the assembly positioned between the first elastic body and the second elastic body.

\* \* \* \* \*